United States Patent
Kim et al.

(10) Patent No.: US 9,481,399 B2
(45) Date of Patent: Nov. 1, 2016

(54) STRUCTURE FOR MOUNTING HOOD HINGE FOR VEHICLE

(71) Applicant: HYUNDAI MOTOR COMPANY, Seoul (KR)

(72) Inventors: Do Hoi Kim, Anyang-si (KR); Jongsoo Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/726,419

(22) Filed: May 29, 2015

(65) Prior Publication Data

US 2016/0152279 A1  Jun. 2, 2016

(30) Foreign Application Priority Data

Dec. 2, 2014  (KR) .................. 10-2014-0170356

(51) Int. Cl.
*B62D 25/02* (2006.01)
*B62D 25/04* (2006.01)
*B62D 25/08* (2006.01)
*B62D 25/12* (2006.01)
*B62D 27/02* (2006.01)

(52) U.S. Cl.
CPC ............. *B62D 25/12* (2013.01); *B62D 25/04* (2013.01); *B62D 25/081* (2013.01); *B62D 27/02* (2013.01)

(58) Field of Classification Search
CPC .... B62D 25/02; B62D 25/025; B62D 25/04; B62D 25/08; B62D 25/081; B62D 25/082; B62D 25/10; B62D 25/105; B62D 25/12; B62D 25/2009; B62D 25/2018; B62D 25/2036; B62D 25/2045; B62D 27/02; B62D 27/023; B62D 27/026
USPC .............................. 296/192, 193.06, 193.11, 296/203.01–203.03, 193.09, 29, 30, 209
See application file for complete search history.

(56) References Cited

U.S. PATENT DOCUMENTS

| | | | | |
|---|---|---|---|---|
| 3,596,978 A * | 8/1971 | Wessells, III | ........ | B62D 25/087 296/203.02 |
| 4,264,101 A * | 4/1981 | Gotoh | ................ | B62D 25/16 296/203.02 |
| 4,883,309 A * | 11/1989 | Miyazaki | ............ | B62D 27/026 296/192 |
| 6,086,144 A * | 7/2000 | Kuwano | ............ | B62D 25/081 296/192 |
| 6,447,052 B2 * | 9/2002 | Saeki | .................... | B62D 21/15 296/187.09 |
| 7,036,874 B2 * | 5/2006 | Stojkovic | ............... | B62D 25/16 296/146.11 |
| 8,162,387 B1 * | 4/2012 | Nydam | .................. | B62D 25/12 180/69.21 |
| 8,550,545 B1 * | 10/2013 | Stojkovic | ............... | B62D 21/12 296/193.09 |

(Continued)

FOREIGN PATENT DOCUMENTS

| JP | 406191441 A | * | 7/1994 | ............ B62D 25/12 |
|---|---|---|---|---|
| JP | 2010-023663 A | | 2/2010 | |
| KR | 10-2008-0052754 A | | 6/2008 | |

*Primary Examiner* — Gregory Blankenship
(74) *Attorney, Agent, or Firm* — McDermott Will & Emery LLP

(57) ABSTRACT

A structure for mounting a hood hinge for a vehicle includes a front pillar outer panel bonded to each of rear portions of fender apron upper members, which extend in a length direction of the vehicle, and mounted to left and right sides of the vehicle. A cowl upper panel extends in a width direction of the vehicle and is bonded to the front pillar outer panel and each of the rear portions of the fender apron upper members. A cowl side outer panel is connected to the fender apron upper member, the front pillar outer panel, and the cowl upper panel. The hood hinge is mounted on the connection portion of the cowl side outer panel and the fender apron upper member.

6 Claims, 6 Drawing Sheets

(56) References Cited

U.S. PATENT DOCUMENTS

| | | | | |
|---|---|---|---|---|
| 8,726,466 B2* | 5/2014 | Kim | B60R 21/38; 16/223 |
| 2005/0046237 A1* | 3/2005 | Miyoshi | B62D 25/082; 296/203.02 |
| 2005/0269838 A1* | 12/2005 | Sohmshetty | B62D 25/082; 296/203.02 |
| 2006/0108837 A1* | 5/2006 | Deme | B62D 25/081; 296/203.02 |
| 2008/0036243 A1* | 2/2008 | Kanagawa | B62D 25/082; 296/192 |
| 2010/0270829 A1* | 10/2010 | Furumoto | B62D 25/12; 296/193.11 |
| 2013/0062911 A1* | 3/2013 | Takeuchi | B62D 25/082; 296/203.02 |
| 2013/0285415 A1* | 10/2013 | Landholm | B62D 25/12; 296/193.11 |
| 2014/0375084 A1* | 12/2014 | Le Roy | B62D 25/081; 296/192 |
| 2015/0176315 A1* | 6/2015 | Labbe | E05D 3/02; 296/193.11 |
| 2015/0210330 A1* | 7/2015 | Ezzat | B62D 25/082; 296/190.01 |
| 2015/0291223 A1* | 10/2015 | Shin | B62D 27/023; 296/192 |
| 2015/0344079 A1* | 12/2015 | Stojkovic | B62D 27/023; 296/187.09 |
| 2015/0375793 A1* | 12/2015 | Donabedian | B62D 21/02; 296/187.09 |
| 2016/0016533 A1* | 1/2016 | Lindmark | B60R 21/38; 296/193.11 |

\* cited by examiner

-- Prior Art --

STRUCTURE FOR MOUNTING HOOD HINGE FOR VEHICLE

CROSS-REFERENCE TO RELATED APPLICATION

This application claims the benefit of priority to Korean Patent Application No. 10-2014-0170356 filed in the Korean Intellectual Property Office on Dec. 2, 2014, the entire content of which is incorporated herein by Reference.

TECHNICAL FIELD

The present disclosure relates to a structure for mounting a hood hinge for a vehicle. More particularly, the present disclosure relates to a structure for mounting a hood hinge for a vehicle, which reinforces stiffness of a hood hinge mounting portion by mounting a hood hinge on a cowl side outer panel combined with a fender apron upper member.

BACKGROUND

In general, a front vehicle body is a fame structure at a front side of a vehicle and defines an engine room. The front vehicle body includes a front end module at a front side of the engine room. The front end module has a cooling module and a head lamp mounted thereon. A fender apron member, on which a suspension system is mounted, is installed at both left and right sides of the engine room and provides a space where a wheel is installed. A dash panel is installed in a rear side of the engine room and divides a passenger room and the engine room. Front side members are mounted under the engine room in a length direction of the vehicle and extend in a width direction on both left and right sides of the vehicle. A sub-frame has an engine and a transmission installed in the engine room and the suspension system mounted thereon to support them.

The fender apron member includes a fender apron upper member at an upper portion of the vehicle. A hood for opening and shutting the engine room is rotatably mounted on a top side of the fender apron upper member via a hood hinge.

FIG. 1 is a schematic modeling drawing of a conventional vehicle body, in which $h_{COG}$ denotes the center of mass of a vehicle, $M_{cabin}$ denotes a vehicle body rotation moment based on $h_{COG}$, $L_{FR\_SUSP}$ denotes a distance from a front suspension to $h_{COG}$, $L_{RR\_SUSP}$ denotes a distance from $h_{COG}$ to a rear suspension, $F_{FR\_SUSP}$ denotes an external force applied to the front suspension, $F_{RR\_SUSP}$ denotes an external force applied to the rear suspension, $F_{s/mbr}$ denotes an external force applied to a front side member when the vehicle collides, and $F_{fa\_upr}$ denotes an external force applied to a fender apron upper member when the vehicle collides.

An impact force is generated when the vehicle collides against an obstacle at the front first acts as the external force $F_{s/mbr}$ for the front side member because the front side member extends longer than the fender apron upper member in the length direction of the vehicle and also acts as the external force $F_{fa\_upr}$ for the fender apron upper member when the collision continues.

The impact external force $F_{s/mbr}$ applied to the front side member generates moment $M_{cabin}=F_{s/mbr}*h_{COG}$ that rotates the vehicle body in a counterclockwise direction around the mass center point $h_{COG}$ of the vehicle. The external force $F_{FR\_SUSP}$ that presses the vehicle body from the top to the bottom acts on the front suspension due to the moment $M_{cabin}$. In contrast, the external force $F_{RR\_SUSP}$ that raises the vehicle body from the bottom to the top in the height direction of the vehicle acts on the rear suspension.

Furthermore, a so-called dipping phenomenon in which a front portion and a dipping measuring unit D of the vehicle sink to the ground G as indicated by an arrow is generated due to the moment $M_{cabin}$, that is, a major cause. Such a dipping phenomenon hinders the optimal behavior of an airbag, for example, when a collision accident is generated in the vehicle, thereby deteriorating collision safety of passengers.

In particular, a rear portion of the fender apron upper member in the length direction of the vehicle does not have a continuous connection structure with a front pillar and a cowl assembly, but has a step to provide the space where a hood hinge mounted thereon and a hood rotate. Impact energy applied to the fender apron upper member when a collision accident occurs at a front side of the vehicle does not effectively transfer and distribute to other portions of the vehicle body due to the step. As a result, a rear connection portion of the fender apron upper member excessively deforms, thereby worsening the dipping phenomenon of the vehicle.

Accordingly, there is a need for an improved vehicle body structure capable of improving collision stability of passengers by reinforcing structural stiffness for mounting a hood hinge and reducing the dipping phenomenon or the amount of dipping when an accident occurs.

The above information disclosed in this Background section is only for enhancement of understanding of the background of the disclosure, and therefore, it may contain information that does not form the prior art that is already known in this country to a person of ordinary skill in the art.

SUMMARY

The present disclosure has been made in an effort to provide a structure for mounting a hood hinge for a vehicle having an advantage of improving collision stability of passengers by reinforcing structural stiffness of a hood hinge mounting portion and reducing the dipping phenomenon or the amount of dipping when a collision occurs.

An exemplary embodiment of the present inventive concept, a structure for mounting a hood hinge for a vehicle includes a front pillar outer panel bonded to each of rear portions of fender apron upper members, which extend in a length direction of the vehicle, and mounted to left and right sides of the vehicle. A cowl upper panel may extend in a width direction of the vehicle and be bonded to the front pillar outer panel and each of the rear portions of the fender apron upper members. A cowl side outer panel may be connected to the fender apron upper member, the front pillar outer panel, and the cowl upper panel. The hood hinge may be mounted on the connection portion of the cowl side outer panel and the fender apron upper member.

The cowl side outer panel may include an upper surface and an outer surface. The fender apron upper member may include an upper surface and an outer surface. The upper surface of the cowl side outer panel and the outer surface of the cowl side outer panel may be bonded together while the upper surface of the cowl side outer panel overlaps with the upper surface of the fender apron upper member and the outer surface of the cowl side outer panel overlaps with the outer surface of the fender apron upper member.

Assembly holes may penetrate the upper surface of the cowl side outer panel and the upper surface of the fender apron upper member. The hood hinge may be engaged with the upper surface of the cowl side outer panel and the upper surface of the fender apron upper member through the assembly holes.

The assembly holes may be spaced apart from each other in the length direction of the vehicle.

The hood hinge may include a first hinge arm engaged with and supported by the cowl side outer panel and the fender apron upper member and a second hinge arm.

The front end of the cowl side outer panel, the front end of the front pillar outer panel, and the front end of the cowl upper panel may be overlapped, arranged, and integrally bonded.

The front pillar outer panel may be joined with a side seal which extends in the length direction of the vehicle. The joint portion of the front pillar outer panel and the side seal may be spaced apart from the outer surface of a tire in the width direction of the vehicle.

The side seal may include a side seal outer panel disposed on an outside in the width direction of the vehicle and a side seal inner panel, which is bonded to the side seal outer panel and has a squared closed section, extending in the length direction of the vehicle and combined with a dash panel. The front pillar outer panel may be bonded to the side seal outer panel.

In accordance with the structure for mounting a hood hinge for a vehicle according to an exemplary embodiment of the present inventive concept, the cowl side outer panel is overlapped and combined with the upper surface of the fender apron upper member in the height direction of a vehicle, and the hood hinge is mounted on the cowl side outer panel and the fender apron upper member. Accordingly, the structural stiffness of a hood hinge mounting portion can be enhanced, the hood hinge can be firmly supported, and a stable opening/shutting behavior of the hood can be achieved.

Furthermore, the stiffness of the hood hinge mounting portion is increased because the cowl side outer panel is also combined with the front pillar outer panel and the cowl upper member. If an impact energy is transferred to the hood hinge mounting portion through the fender apron upper member when a collision occurs at the front of a vehicle, the impact energy transferred to the cowl side outer panel is efficiently transferred and distributed to the front pillar and the cowl upper member. Accordingly, excessive deformation attributable to the concentration of impact energy in the hood hinge mounting portion can be suppressed, the amount of dipping can be reduced, and thus, collision stability of passengers can be improved.

DETAILED DESCRIPTION OF THE EMBODIMENTS

Hereinafter, exemplary embodiments of the present inventive concept are described in detail with reference to the accompanying drawings.

Figure 1:
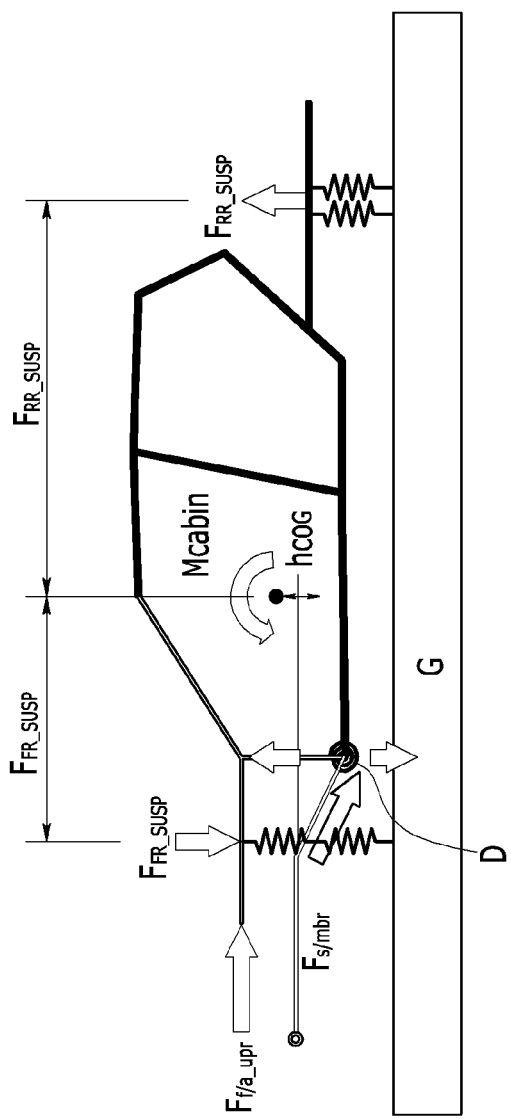
FIG. 1 is a schematic modeling drawing of a conventional vehicle body.
Figure 2:
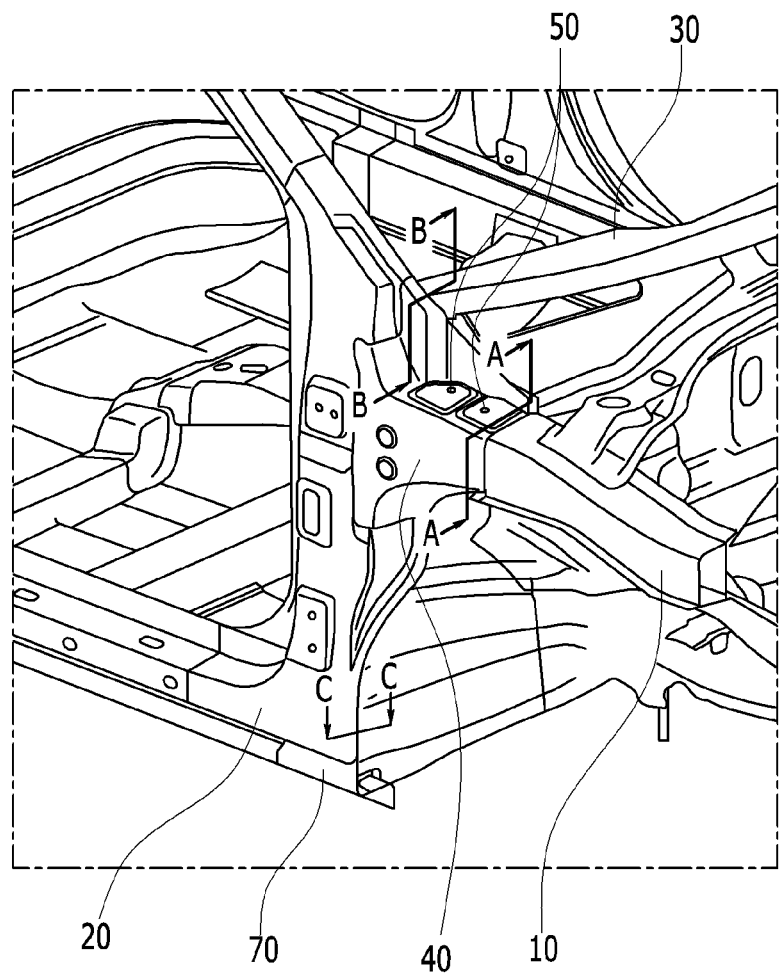
FIG. 2 is a perspective view of a structure for mounting a hood hinge in accordance with an exemplary embodiment of the present inventive concept.
Figure 3:
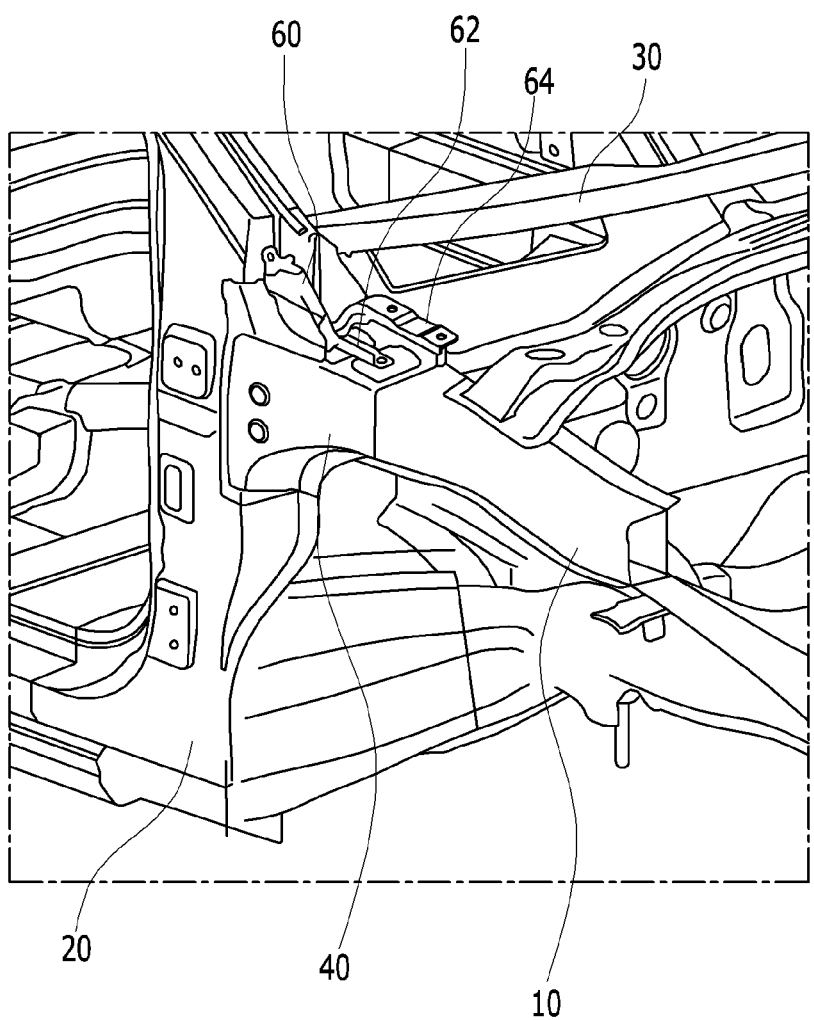
FIG. 3 is a perspective view illustrating the structure for mounting a hood hinge having the hood hinge mounted thereon in accordance with an exemplary embodiment of the present inventive concept.

Referring to FIGS. 2 and 3, a front vehicle body to which a structure for mounting a hood hinge for a vehicle in accordance with an exemplary embodiment of the present inventive concept is applied may include fender apron upper members 10 extending in a length direction on both left and right sides of the vehicle.

Furthermore, each of rear portions of the fender apron upper members 10 in the length direction of the vehicle may be combined with a front pillar outer panel 20 of a front pillar to extend and a cowl upper panel 30 extending in a width direction of the vehicle.

Each of the fender apron upper members 10 may have a square box-shape section extending back and forth in the length direction of the vehicle.

A cowl side outer panel 40 may be combined with a portion in which a rear portion of the fender apron upper member 10 and the front pillar outer panel 20 are combined.

Figure 4:
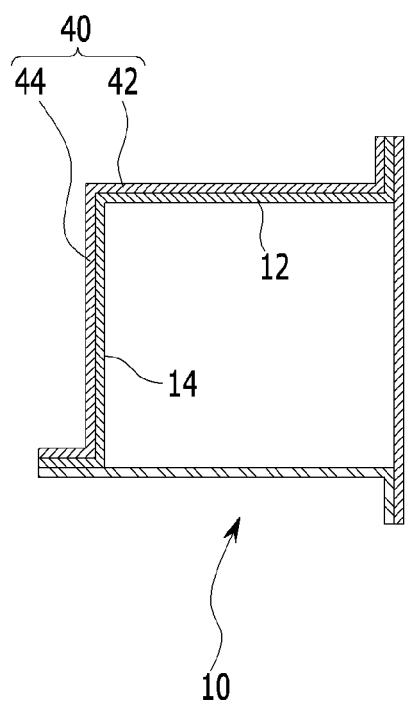
FIG. 4 is a cross-sectional view of the structure taken along the line A-A of FIG. 2.

As illustrated in FIG. 4, the cowl side outer panel 40 may be overlapped and integrally combined with an upper surface 12 of the fender apron upper member 10 in the height direction of the vehicle and an outer surface 14 of the fender apron upper member 10 in the width direction of the vehicle.

That is, the cowl side outer panel 40 may include an upper surface 42 in the height direction of the vehicle and an outer surface 44 in the width direction of the vehicle. The cowl side outer panel 40 may be bonded to and combined with the fender apron upper member 10 in which the upper surface 42 overlaps with the upper surface 12 of the fender apron upper member 10 and the outer surface 44 overlaps with the outer surface 14 of the fender apron upper member 10.

Assembly holes 50 that penetrate the respective upper surfaces 42 and 12 may be formed in which the upper surface 42 of the cowl side outer panel 40 overlaps with the upper surface 12 of the fender apron upper member 10. The assembly holes 50 may be spaced apart from each other back and forth in the length direction of the vehicle.

A hood hinge 60 may be stably seated on and engaged with the upper surface 42 of the cowl side outer panel 40 via engagement bolts inserted into the assembly holes 50.

The hood hinge 60 may include a first hinge arm 62 engaged with and supported by the cowl side outer panel 40 and the fender apron upper member 10 and a second hinge arm 64 engaged with a hood (not illustrated).

The hood relatively rotates around the vehicle body due to relative motion of the second hinge arm 64 with respect to the first hinge arm 62, thus opening and closing an engine room.

Figure 5:
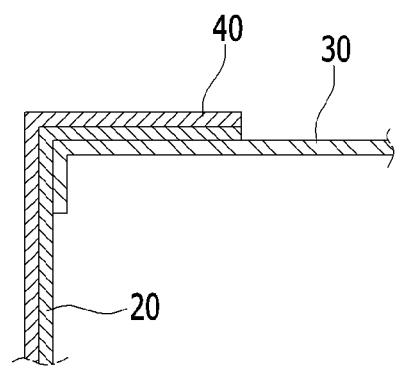
FIG. 5 is a cross-sectional view of the structure taken along the line B-B of FIG. 2.

Referring to FIG. 5, the front end of the cowl side outer panel 40 in the width direction of the vehicle, the front end of the front pillar outer panel 20, and the front end of the cowl upper panel 30 may be overlapped, arranged, and integrally bonded to each other in the height direction of the vehicle.

The hood hinge 60 is mounted on a portion where the cowl side outer panel 40 overlaps with the fender apron upper member 10 in a state in which the cowl side outer panel 40 is connected to the fender apron upper member 10, the front pillar outer panel 20, and the cowl upper panel 30 as described above. Accordingly, the hood can be smoothly open and closed because structural stiffness of a hood hinge mounting portion is enhanced and the hood can be strongly supported.

Furthermore, impact energy transferred to the fender apron upper member when a collision occurs at the front of the vehicle is properly effectively transferred and distributed to the front pillar and the cowl member through the side outer panel. Accordingly, local and excessive deformation of the vehicle body that occurs because impact energy is not smoothly distributed in a conventional hood hinge mounting portion can be prevented. As a result, the amount of dipping can be reduced, and collision stability of passengers can be improved.

Figure 6:
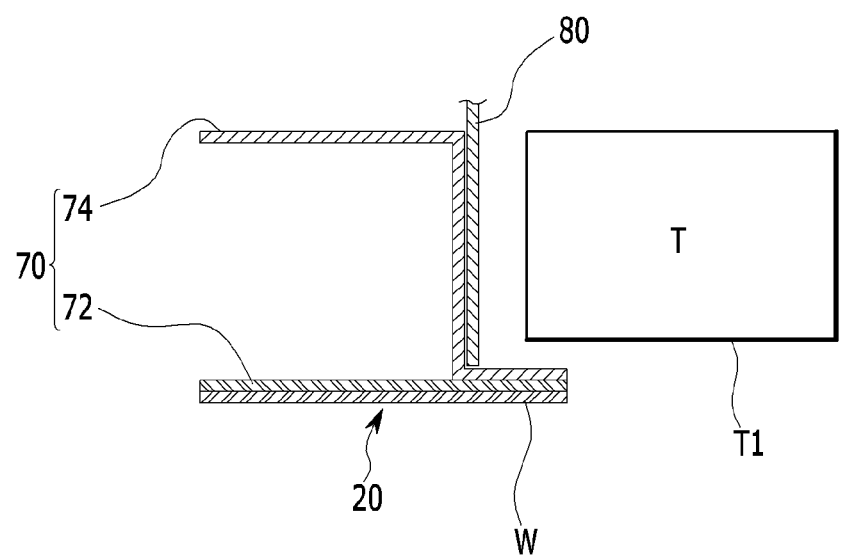
FIG. 6 is a cross-sectional view of the structure taken along the line C-C of FIG. 2.

Referring to FIGS. 2 and 6, the front pillar outer panel 20 may be combined with a side seal 70 extending back and forth in the length direction of the vehicle.

The side seal 70 may include a side seal outer panel 72 bonded to the front pillar outer panel 20 and a side seal inner panel 74 bonded to the side seal outer panel 72 and having a square closed section.

The side seal inner panel 74 may be combined with a dash panel 80 extending in the width direction of the vehicle and partitioning the engine room and a passenger room.

A joint portion W at which the front pillar outer panel 20 and the side seal outer panel 72 are bonded together may be disposed at the furthest outside in the width direction of the vehicle and placed farther from an outer surface T1 in the width direction of a tire T.

If the joint portion W is externally disposed from the outer surface T1 of the tire in the width direction of the vehicle as described above, a phenomenon that the joint portion W may be burst or broken due to the tire T if the tire T externally moves in the width direction of the vehicle when a small overlap collision accident occurs in the vehicle can be reduced. Accordingly, the stiffness of the vehicle body and collision stability can be improved.

While this disclosure has been described in connection with what is presently considered to be practical exemplary embodiments, it is to be understood that the disclosure is not limited to the disclosed embodiments, but on the contrary, is intended to cover various modifications and equivalent arrangements included within the spirit and scope of the appended claims.

What is claimed is:

1. A structure for mounting a hood hinge for a vehicle, comprising:
    a front pillar outer panel bonded to each of rear portions of fender apron upper members, which extend in a length direction of the vehicle, and mounted to left and right sides of the vehicle;
    a cowl upper panel extending in a width direction of the vehicle and bonded to the front pillar outer panel and each of the rear portions of the fender apron upper member; and
    a cowl side outer panel connected to the fender apron upper member, the front pillar outer panel, and the cowl upper panel, wherein
    the hood hinge is mounted on a connection portion of the cowl side outer panel and the fender apron upper member,
    wherein the cowl side outer panel comprises an upper surface and an outer surface,
    wherein the fender apron upper member comprises an upper surface and an outer surface,
    wherein upper surface of the cowl side outer panel and the outer surface of the cowl side outer panel are bonded together while the upper surface of the cowl side outer panel overlaps with the upper surface of the fender apron upper member and the outer surface of the cowl side outer panel overlaps with the outer surface of the fender apron upper member,
    wherein the fender apron upper member has assembly holes penetrating the upper surface of the cowl side outer panel and the upper surface of the fender apron upper member, and
    wherein the hood hinge is engaged with the upper surface of the cowl side outer panel and the upper surface of the fender apron upper member through the assembly holes.

2. The structure of claim 1, wherein the assembly holes are spaced apart from each other in the length direction of the vehicle.

3. The structure of claim 1, wherein the hood hinge comprises:
    a first hinge arm engaged with and supported by the cowl side outer panel and the fender apron upper member, and
    a second hinge arm.

4. The structure of claim 1, wherein a rear end of the cowl side outer panel, a front end of the front pillar outer panel, and a rear end of the cowl upper panel are overlapped, arranged, and integrally bonded.

5. The structure of claim 1, wherein:
    the front pillar outer panel is jointed with a side sill extending in the length direction of the vehicle; and
    the joint portion of the front pillar outer panel and the side sill is spaced apart from an outer surface of a tire in the width direction of the vehicle.

6. The structure of claim 5, wherein the side sill comprises:
    a side sill outer panel disposed on an outside in the width direction of the vehicle; and
    a side sill inner panel, which is bonded to the side sill outer panel and has a squared closed section, extending in the length direction of the vehicle and combined with a dash panel, and
    the front pillar outer panel is bonded to the side sill outer panel.

* * * * *